United States Patent [19]

Hamel et al.

[11] Patent Number: 4,575,900
[45] Date of Patent: Mar. 18, 1986

[54] PNEUMATIC STUNNER

[75] Inventors: Jerome T. Hamel, Shawnee; Bernard G. Huff, Shawnee Mission, both of Kans.

[73] Assignee: Hantover, Inc., Kansas City, Mo.

[21] Appl. No.: 702,374

[22] Filed: Feb. 15, 1985

Related U.S. Application Data

[63] Continuation-in-part of Ser. No. 484,938, Apr. 14, 1983, Pat. No. 4,503,585.

[51] Int. Cl.$^4$ .............................................. A22B 3/02
[52] U.S. Cl. ....................................... 17/1 B; 227/8; 227/130
[58] Field of Search ..................... 227/8, 130; 17/1 B; 42/1 M

[56] References Cited

U.S. PATENT DOCUMENTS

| | | |
|---|---|---|
| 3,572,572 | 3/1971 | Readyhough ....................... 227/130 |
| 3,708,096 | 1/1973 | Burke, Jr. . | |
| 3,715,069 | 2/1973 | O'Conner . | |
| 3,784,077 | 1/1974 | Burke, Jr. et al. | |
| 4,280,248 | 7/1981 | Herubel ........................... 227/130 X |
| 4,351,464 | 9/1982 | Fehrs et al. .......................... 227/8 X |

FOREIGN PATENT DOCUMENTS

| | | | |
|---|---|---|---|
| 2927606 | 7/1979 | Denmark ............... | 17/1 B |
| 168769 | 1/1905 | Fed. Rep. of Germany ........ | 17/1 B |
| 406235 | 2/1934 | United Kingdom ................ | 17/1 B |

Primary Examiner—Willie G. Abercrombie
Attorney, Agent, or Firm—Schmidt, Johnson, Hovey & Williams

[57] ABSTRACT

An actuator assembly for a stunning gun has a trigger valve in addition to a second shiftable nose piece valve. In use, the trigger valve is manually depressed to open and the user then moves the stunner such that the nose piece shifts as the animal is engaged, whereupon the second valve opens. The stunner will fire only when both valves are simultaneously open, and thus the possibility of inadvertent actuation is significantly reduced. The pneumatic valve assembly requires very little force to operate, in contrast to mechanical trip actuators.

7 Claims, 2 Drawing Figures

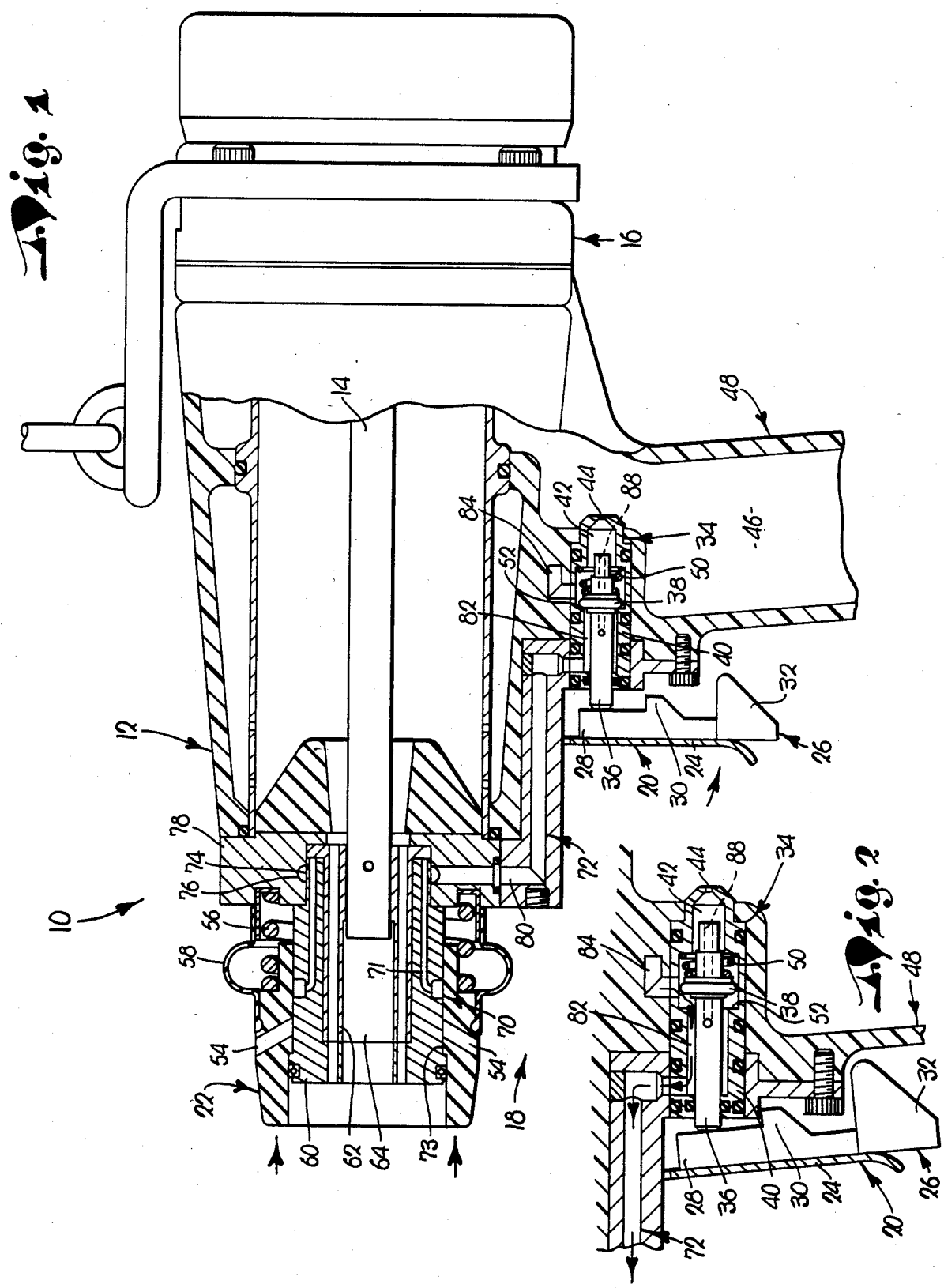

PNEUMATIC STUNNER

This application is a continuation-in-part of a copending application for U.S. Letters Pat., Ser. No. 484,938, filed Apr. 14, 1983.

BACKGROUND OF THE INVENTION

1. Field of the Invention

This invention relates to a animal stunning device for use in an animal slaughter house operation and more particularly to improvements in the actuating mechanisms of such devices.

2. Description of the Prior Art

The related application discloses a humane animal stunner having a stunning element which reciprocates from within the stunner to a position outside the stunner, a support nose passageway which provides direction and support for the stunning element during operation, and a trigger assembly for initiating projection of the stunning element. The trigger is engageable with a pneumatic trigger valve that is operable to exhaust air to the atmosphere, and the stunner is actuated when the valve is opened to exhaust the air. The trigger mechanism includes a selectively actuable safety block which may be shifted between an operating position, enabling the trigger, and a safe position, preventing trigger operation.

Due to the potentially hazardous nature of the stunner, it is of utmost concern that the chances of inadvertent actuation of the stunning element be reduced as much as possible. The safety block associated with the trigger mechanism as disclosed in the above referenced parent application is useful for precluding actuation of the stunner when the latter is not in constant use; however, the operator may inadvertently fail to use the safety block or, alternatively, may accidentally depress the trigger at an inopportune moment.

Portable pneumatic fastener driving devices are occasionally provided with structure somewhat similar to the driving means used in animal stunners, and such fastener driving devices are sometimes provided with a concomitant actuating mechanism to deter accidental actuation. In the past, such a safety mechanism has comprised a mechanical, motion-transmitting linkage between the trigger and an outwardly extending, shiftable work contacting member. As the operator moves the fastener driving device to the work, the contact member shifts inwardly and the linkage moves to enable operation of the trigger. Consequently, the device is actuated only when both the work contact member and the trigger are shifted. Such actuating mechanisms are illustrated for example in U.S. Pat. Nos. 3,572,572, issued Mar. 30, 1971 and 3,784,077, issued Jan. 8, 1974.

Unfortunately, such mechanically linked actuating mechanisms are subject to wear, often to the point where actuation is possible by sufficient trigger pressure alone. Obviously, this condition presents a serious safety hazard which is even more dangerous when the operator is relying upon the mechanism to prevent such unwanted actuation. Furthermore, such linkages tend to jam when utilized in animal stunners because of the large amount of airborne foreign matter normally encountered in slaughter house operations.

SUMMARY OF THE INVENTION

The present invention overcomes the disadvantages of the prior art by the provision of a novel air trip actuator which enables intentional firing of the stunner while effectively ensuring against accidental discharge. The actuator is of simple construction and yet cannot jam or otherwise be rendered inoperable due to foreign material.

In more detail, the air trip actuator comprises a sleeve-like nose piece carried by the stunner housing which is shiftable when placed in engagement with an animal to be stunned. The nose piece has a plurality of bores which communicate the trigger valve exhaust port to the atmosphere whenever the nose piece shifts in response to engagement with the animal. As a result, the air exhausted by the trigger valve is vented to the atmosphere only when the nose piece concomitantly engages the animal.

From the above, it can be seen that in accordance with the principals of the present invention the pressure required to depress the trigger is reduced significantly. In normal use, the trigger is depressed before the nose piece contacts the animal, and thus the air pressure on either side of the trigger valve is equal such that manual force is necessary only to overcome the trigger valve spring. In contrast, prior art trigger valves are vented directly to the atmosphere and thus the operator must overcome the pressure exerted by both the compressed air and the spring. Therefore, repeated operation of the present stunner is not strenuous to the operator.

Moreover, the mechanical trip linkage as found in prior art constructions typically required that the operator administer a severe "hammer blow" which also often caused user fatigue. In contrast, the force required to actuate the air trip contact member of the present stunner is significantly reduced to only the force which is required to slide the seals engaging the nose piece and overcome the bias of a return spring.

BRIEF DESCRIPTION OF THE DRAWINGS

FIG. 1 is a fragmentary, partially sectional view of the animal stunner illustrating the air trip actuator in accordance with the invention; and FIG. 2 is a fragmentary, enlarged, sectional view of the trigger valve and fluid conduit of the animal stunner, illustrating the position of the valve when the trigger is depressed.

DETAILED DESCRIPTION

In particular aspects, the present invention is concerned with improved versions of known pneumatic fastener driving guns and, accordingly, all of the details of construction and operation need not be fully described. The following patents illustrate known pneumatic fastener drivers and the disclosures thereof are incorporated herein by reference: U.S. Pat. Nos. 3,784,077, 3,715,069 and 3,708,096.

Referring to the drawings, the animal stunner 10 broadly includes a hollow housing 12, a stunning element 14, shiftable mounting means 16 for projecting one end of the stunning element 14 from the housing 12 for stunning an animal, and an actuating assembly 18 for initiating the operation of the stunner 10. The actuating assembly 18 includes a trigger means 20, a trigger valve 34, a slidable, sleeve-like nose piece 22, a second valve 70 and a fluid conduit means 72.

In more detail, the trigger means 20 includes a face plate 24 swingably mounted on the housing 12 and a safety block 26 shiftably engaging the face plate 24. The safety block 26 has an upper member engaging portion 28, an engagement surface projection 30 and a lower handle 32. The trigger means 20 is manually shiftable from an inoperative position, as shown in FIG. 1, to an operative position as depicted in FIG. 2.

The trigger valve 34 is operable by the trigger means 20 for movement from a closed position, as shown in FIG. 1, to an open position, as illustrated in FIG. 2, when the trigger means 20 is shifted from an inoperative position to an operative position. As best seen in FIG. 2, the trigger valve 34 includes an elongated, axially shiftable operating member 36 having a resilient valve seal 38. Additionally, the trigger valve 34 includes a tubular guide structure 40 defining an elongated, internal, air chamber 42 which communicates by means of a restricted orifice 44 with an air chamber 46 within a handle grip 48 of the housing 12. A coil return spring 50 is positioned between the valve seal 38 and a reduced portion of the guide structure 40, and the spring 50 serves to bias the member 36 outwardly to its inoperative position wherein the valve seal 38 sealingly engages a seating surface 52 on the guide structure 40.

The animal contact responsive member or nose piece 22 is carried by the housing 12 and is shiftable from an outward, inoperative position, as shown in FIG. 1, to an operative position (not shown) in response to cooperative engagement with an animal to be stunned. The nose piece 22 is generally cylindrical and has a plurality of exhaust ports 54 disposed at spaced intervals. The nose piece 22 is biased outwardly by a coil spring 56 generally disposed between the nose piece 22 and the housing 12. A resilient boot 58 engages both the nose piece 22 and the housing 12 and covers spring 56 to preclude accumulation of foreign material in the vicinity of the spring 56.

The nose piece 22 is slidably received on a nose bearing 60 of the housing 12. A cylindrical, elongated sleeve 62 fixedly engages the nose bearing 60 and has an internal, elongated central passageway 64 complementally configured for slidably receiving the stunning element 14.

The second valve 70 is operably connected with the nose piece 22 for movement from a closed position to an open position when the nose piece 22 is engaged with an animal to be stunned. As shown in FIG. 1, the second valve 70 comprises a plurality of fluid passageways 71 within the nose bearing 60 and an inner, cylindrical surface 73 of the nose piece 22. The passageways 71 are disposed for communication with the exhaust ports 54 in the nose piece 22 when the latter is shifted inward to its operative position. The passageways 71 are in non-communication with the exhaust ports 54 whenever the nose piece 22 is in its inoperative position.

The fluid conduit means 72 operably couples the first or trigger valve 34 and the second valve 70 to a projecting means (not shown). The fluid conduit means 72 includes a plurality of apertures 74 within the nose bearing 60 that communicate with each of the passageways 71. Also, the conduit means 72 includes an annular groove 76 within a nose plate 78 attached to the housing 12, and an elongated bore 80 disposed within the housing 12 and communicating with the annular groove 76. Furthermore, the conduit means 72 includes a channel 82 disposed within the guide structure 40 proximal the operating member 36. Additionally, the conduit means 72 includes a channel 84 which communicates the air chamber 42 with a valve structure (not shown) for projecting the stunning element 14 outwardly from the housing 12. Finally, a restricted passageway 88 communicates the channel 82 of the conduit means 72 with the air chamber 42 of the guide structure 40. The restricted passageway 88 is disposed substantially centrally within the operating member 36.

Operation

In use, the stunning element 14 is projected outwardly from the housing 12 by means of a valving structure (not shown) in communication with the channel 84. A rapid drop of air pressure within the channel 84 will operatively move the valve structure to a position wherein pressurized air within the chamber 46 is admitted to an area within the piston sleeve 68 behind a piston (not shown) connected to the stunning element 14. Subsequently, the air pressure differential between the pressurized region behind the piston and the remaining, vented portions of the piston sleeve 68 rapidly drives the piston outwardly such that the stunning element 14 is projected through the nose bearing 60 to stun the animal.

The fluid pressure actuating means for operably opening the valve structure to drive the piston includes the trigger means 20, the trigger valve 34, the nose piece 22, the second valve 70 and the fluid conduit means 72. Normally, pressurized air within the air chamber 46 is delivered to a restricted orifice (not shown) to the valve structure such that the latter remains closed to preclude operation of the piston or projecting means. However, as the actuating means is utilized to rapidly relieve the air pressure surrounding the valve structure, the latter opens whereby the pressurized air within the chamber 46 outwardly projects the piston and stunning element 14.

The air pressure within the channel 84 is equal to the air pressure within the chamber 46 whenever the actuating means is inactivated. As shown in FIG. 1, the valve seal 38 engages the seating surface 52 due to the bias of the coil spring 50 against the operating member 36 whenever the trigger means 20 is in its inoperative position. As such, air will enter from the chamber 46 through the restricted orifice 44 and into the chamber 42, whereby pressure within the channel 84 will equalize with the pressure within chamber 46.

Additionally, air pressure within the bore 80 and the channel 82 is substantially equal to the pressure within the chamber 46 whenever the actuating means is inactivated. The restricted passageway 88 within the operating member 36 insures that pressure will equalize on both sides of the valve seal 38 after a short time period following inactivation of the control means.

To actuate the stunner 10, the trigger means 20 is depressed whereupon the member-engaging portion 28 forces the operating member 36 inwardly against the bias of the spring 50. Simultaneously, the valve 38 disengages the seating surface 52 to communicate the channel 84 with the channel 82 and the bore 80. However, because the air pressure within the bore 80 and the channel 82 is substantially equal to the pressure within the channel 84, the valve structure of the projecting means fails to open and the stunning element remains inactivated. The second valve 70 in its inoperative position is closed by means of the surface 73 to block escape of air within the bore 80 to the atmosphere.

As the operator moves the stunner 10 into engagement with an animal to be stunned, the nose piece 22 shifts as indicated by the direction of the arrows in FIG. 1 from an inoperative position to an operative position. Simultaneously, the second valve 70 moves from a closed position to an open position as the exhaust ports 54 are moved into a position to align and communicate with the passageways 71. Accordingly, pressurized air within the passageway 71, the bore 80 and the channel 82 is immediately exhausted through the ports 54 to atmosphere.

If the trigger valve 34 is opened concomitantly with the opening of the second valve 70, air pressure within the entire fluid conduit means 72, including the channel 84, is relieved. Consequently, the valve structure of the projection means responds to this change in applied fluid pressure within the conduit means 72 such that the stunning element 14 is rapidly projected through the nose bearing 60 to stun the animal. The stunner 10 will fire whenever the first valve 34 and the second valve 70 are simultaneously open regardless of which valve is opened first; thus, maximum operational flexibility and convenience are afforded to the user.

As manual pressure upon the trigger means 20 is relieved, the trigger valve 34 closes by means of the bias presented by the spring 50 upon the operating member 36. Also, as the stunner 10 is moved to disengage from the animal, the second valve 70 closes as the spring 56 outwardly shifts the nose piece 22. Pressurized air within the chamber 46 enters the chamber 42 through the restricted orifice 44, and simultaneously enters the channel 82, the bore 80 and the passageway 71 by means of the restricted passageway 88 within the operating member 36. Thus, pressure within the entire fluid conduit means 72 is equalized within a short time period to the pressure within the chamber 46.

Noteworthy also is the fact that if the second valve 70 is closed, the finger pressure required to shift the trigger means 20 to open the trigger valve 34 is merely the force required to overcome the bias of the spring 50, since the air pressure within the channel 82 is equal to the pressure within the chamber 42. Moreover, use of the air trip, nose piece valve 70 requires that the operator overcome merely the frictional resistance of a sliding seal 86 in addition to the bias presented by the spring 56.

Additionally, the elimination of a mechanical linkage removes the possibility of clogging or blockage of the link arms by animal hair or other debris which is constantly found in a slaughter house. The exhaust ports 54 are generally self-cleaning due to the blast of air which is expelled during each cycle of operation.

We claim:

1. In a stunner having a housing, a stunning element, means shiftably mounting said stunning element within said housing, said mounting means including fluid pressure operable means for projecting the end of said element from said housing for stunning an animal in response to a change in applied fluid pressure, and fluid pressure actuating means operably coupled to said projecting means, said actuating means comprising:
   trigger means connected to said housing for manual shifting from an inoperative position to an operative position;
   a first valve operably connected to trigger means for movement from a closed position to an open position as said trigger means is shifted from an inoperative position to an operative position;
   an animal contact responsive member carried by said housing and shiftable from an inoperative position to an operative position in response to cooperative engagement with an animal to be stunned;
   a second valve operably connected with said contact member for movement from a closed position to an open position as said contact member is shifted from an inoperative position to an operative position;
   exhaust means operably coupling said second valve with the atmosphere; and
   fluid conduit means operably coupling said first valve and said second valve to said projecting means,
   said fluid conduit means also being adapted to be pressurized with air when said second valve is closed,
   said projecting means being operable to project said stunning element only in response to shifting both of said trigger means and said contact member to an operative position wherein both said first valve and said second valve are open such that pressurized air within said fluid conduit is exhausted.

2. The invention of claim 1, said second valve comprising a surface on said contact member being disposed to obstruct said conduit means when said contact member is in said inoperative position, and disposed to not obstruct said conduit means when said contact member is in said operative position.

3. The invention of claim 1, said exhaust means being a port disposed within said contact member.

4. The invention of claim 1, said contact member being a sleeve-like nose piece slidably carried by said housing.

5. The invention of claim 4; and means yieldably biasing said nose piece outwardly from said housing toward said inoperative position.

6. The invention of claim 1; and a restricted passageway for pressurizing said fluid conduit whenever said first valve and said second valve are closed.

7. In a stunner having a housing, a stunning element, means shiftably mounting said stunning element within said housing, said mounting means including fluid pressure operable means for projecting the end of said element from said housing for stunning an animal in response to a change in applied fluid pressure, and fluid pressure actuating means operably coupled to said projecting means, said actuating means comprising:
   a manually actuable first valve;
   a second valve;
   means operably opening said second valve as said stunner is moved to engage an animal;
   fluid conduit means operably coupling said first valve and said second valve to said projecting means;
   exhaust means operably coupling said second valve with the atmosphere; and
   means pressurizing said fluid conduit when said second valve is closed,
   said projection means being operable to project said stunning element from said housing only when both of said first valve and said second valve are opened.

* * * * *